United States Patent
Kramer et al.

[11] Patent Number: 5,435,175
[45] Date of Patent: Jul. 25, 1995

[54] WIND TUNNEL HAVING A FREE JET TEST SECTION FOR SIMULATING WIND DIRECTION FLUCTUATIONS

[75] Inventors: Carl Kramer; Bernd Konrath, both of Aachen, Germany

[73] Assignee: Mercedes Benz AG, Stuttgart, Germany

[21] Appl. No.: 244,483
[22] PCT Filed: Nov. 28, 1992
[86] PCT No.: PCT/EP92/02757
 § 371 Date: Jul. 27, 1994
 § 102(e) Date: Jul. 27, 1994
[87] PCT Pub. No.: WO93/11417
 PCT Pub. Date: Jun. 10, 1993

[30] Foreign Application Priority Data
Nov. 29, 1991 [DE] Germany .......... 41 39 359.7

[51] Int. Cl.⁶ .................................. G01M 9/00
[52] U.S. Cl. .......................... 73/147; 138/45
[58] Field of Search ........... 73/147, 178 R, 861.52, 73/865.6; 138/45, 46

[56] References Cited
U.S. PATENT DOCUMENTS

| | | |
|---|---|---|
| 3,104,680 | 9/1963 | Orlin ..................... 73/147 |
| 3,236,263 | 2/1966 | Holderer ............... 73/147 |
| 4,398,415 | 8/1983 | Jacocks et al. ........ 138/45 |
| 5,025,659 | 6/1991 | Starr, Jr. et al. ..... 73/865.6 |

FOREIGN PATENT DOCUMENTS 3715016 12/1988 Germany .
4007230 9/1990 Germany .

*Primary Examiner*—Richard F. Chilcot, Jr.
*Assistant Examiner*—William E. Oen
*Attorney, Agent, or Firm*—Evenson McKeown Edwards & Lenahan

[57] ABSTRACT

Wind tunnel having a free jet test section for simulating wind direction fluctuations, principally for the investigation of vehicles, equipped with a nozzle which can be rotated when the wind tunnel is operating, in order to alter the wind flow direction, in which arrangement the nozzle comprises a stationary part and a rotatable front part and the nozzle front part is surrounded by a cylinder surface which is sealed off in the manner of a plug in the end wall of the nozzle prechamber in relation to the test chamber; within the nozzle prechamber, which surrounds the nozzle, a compensating flow can take place upon rotation of the nozzle front part, so that the quality of the jet flow of the wind tunnel is, if at all, only barely noticeably impaired by the rotational movement. In order to investigate flow-acoustic problems with a varying wind direction, the wind tunnel can be equipped with sound deadening and sound attenuating devices as well as an absorbing lining.

10 Claims, 9 Drawing Sheets

WIND TUNNEL HAVING A FREE JET TEST SECTION FOR SIMULATING WIND DIRECTION FLUCTUATIONS

BACKGROUND AND SUMMARY OF THE INVENTION

The invention relates to a wind tunnel having a free jet test section in which the direction of flow can be rotated during the operation of the wind tunnel. According to the teachings of the invention, this is possible while the wind is blowing, without having to tolerate substantial losses of aerodynamic quality of the flow with regard to uniformity of the velocity distribution and magnitude of the degree of turbulence.

A wind tunnel in which the direction of flow can be rotated during the operation of the wind tunnel is already known from German Patent Document DE 3715016. This wind tunnel is principally intended for aeroacoustic investigations of motor vehicles and is distinguished in that the fan is designed to simulate the flow noise of the motor vehicle standing in an acoustic chamber. However, what is to be understood from the design for the simulation of circumcirculation noise is not evident from the teachings of the described arrangement. In the disclosed arrangement, furthermore, a device is described in which the exit cross-section of the free jet nozzle is markedly smaller than the cross-sectional area of the motor vehicle against which flow is directed. It emerges from this that no excessively stringent requirements are imposed upon the quality of the aerodynamic circumcirculation simulation. For gust simulation, the nozzle can, in accordance with the teachings of the invention DE 3715016, be rotated in the manner of a pendulum about its vertical axis. The connection between nozzle and nozzle prechamber takes place in this case by means of a flexible hose conduit. Since in the course of the rotation of the nozzle the curvature of this hose conduit and consequently also the velocity profile of the elbow flow becoming established constantly changes, the uniformity of the velocity distribution in the nozzle exit cross-section which is attainable by this device is rather moderate.

A further wind tunnel in which the direction of the air flow on emerging from a rigid free jet nozzle can be altered is known from German Patent Document DE 40 07 230. In this case, airfoil wing profiles which are disposed in the form of a cascade and are pivotable in each instance about their vertical axis are used for the purpose of changing the direction of flow. In order that the change of direction of the free jet should be possible, this cascade with the pivotably disposed profiles is mounted behind the exit of the wind tunnel nozzle. The object to be investigated in the wind tunnel test section, which according to the teachings of the described arrangement is preferably a motor vehicle or a motor vehicle model, is therefore exposed to the jet flow influenced by the cascade. This jet flow is characterized by the wakes behind the profiles, which wakes are unavoidable even with the most careful design of the profiles. The wind tunnel could scarcely be suitable for aeroacoustic investigations for example, since upon the free jet noise there is also in addition superposed the noise of the profile cascade which is circumcirculated at high velocity, namely the outflow velocity from the nozzle. With regard to the jet turbulence as well, such a wind tunnel device does not satisfy the requirements to be satisfied for the execution of precise aerodynamic investigations, since the jet turbulence is greatly influenced by the wakes behind the individual profiles and this turbulence moreover still alters to a large extent with the passage distance of the flow as a result of the mixing of these wakes with the flow passing through between the profiles. This would mean for example that the turbulence at the front part of a motor vehicle to be investigated has a different structure from that at the rear.

A similar device for generating gust in a wind tunnel is described by W. Baumert et al. of the Deutsche Forschungs- und Versuchsanstalt für Luft- und Raumfahrt in the report DFVLR Reports 89/05 in paragraph 7.4. However, in this case what are involved are relatively small angle changes which take place with relatively high frequency, e.g. gust amplitude ±2° at a frequency of 20 Hz. This provides a device which is essentially suitable for flight-mechanics and especially aeroelastic investigations and is unsuitable for measurements on motor vehicles, where substantially greater angular deviations of up to 20° are required. Another disadvantage of this device is further, as is evident from FIG. 7.4-3 of said publication, that the gust angle alters very greatly over the passage distance of the flow, while for example at a spacing of 900 mm a still approximately constant angle of approximately 0.7° becomes established over the entire height of the wind tunnel nozzle, and already after a further 900 mm passage distance the gust angle at a gust frequency of 5 Hz is twice as great at the upper jet margin than at the lower. Thus, this device is also suitable at all events for indicative studies and does not satisfy the stringent requirements for development work in the sector of motor vehicle aerodynamics and especially the flow acoustics of motor vehicles.

A further wind tunnel, in which an acceptable simulation of the circumcirculation can be achieved with a relatively small nozzle exit cross-section, is known from U.S. Pat. No. 5,025,659. The improved flow simulation with a relatively small nozzle exit cross-section is achieved by lengthening the nozzle by means of slotted walls. These slotted walls permit a pressure compensation and prevent the development, which is unavoidable in the case of a pure free jet, of a mixing zone, the transverse dimension of which increases in the direction of flow, i.e. along the test specimen. However, this process functions only in the case of a symmetric or approximately symmetric flow onto the test specimen. Since moreover nozzle and sidewalls are rigid, the wind tunnel according to the U.S. Patent is unsuitable for gust simulation.

Details concerning an aeroacoustic wind tunnel are known for example from the AGARD Report No. 601 "Problems in Wind Tunnel Testing Techniques" of 1973 and especially from the paper included in this report by T. A. Holbeche and J. Williams "Acoustic Considerations for Noise Experiments at Model Scale in Subsonic Wind Tunnels". The test section is surrounded by a so-called anechoic chamber with high acoustic absorption. Both on the inlet side and also on the outlet side in relation to the fan which drives the air flow through the test chamber in the circuit, the flow guidance system includes acoustic attenuators which, in the case of a wind tunnel with a closed flow guidance system, are expediently combined with the deflection angles. In this case, the insertion absorption of these acoustic attenuators is to be of such magnitude that the sound pressure level originating from the fan, in the test chamber, is sufficiently, e.g. 10 dB, below the sound pressure level which is generated by the test jet. In these circumstances, the fan noise in the test chamber is no longer perceptible and also no longer has a disturbing effect on accurate acoustic measurements.

However, the wind tunnel design known from this publication cannot be used for gust simulation, since no measures are provided for the instantaneous alteration of the direction of flow.

Accordingly, the object of the invention is to develop further the known wind tunnel designs and to provide a wind tunnel which, besides a simulation of the complete circumcirculation which is sufficiently good even for development work, permits a possibility of gust simulation by rotation of the wind direction and in addition, with an appropriate design of the wind tunnel, also permits aeroacoustic investigations.

Such a wind tunnel is of advantage in all cases where rapid changes of the direction of flow, as occur for example in the natural wind, are to be simulated, or where the intention is to study the aerodynamic properties and the reaction of a circumcirculated body in a flow field with a rapidly varying direction of flow. This is of particular importance in the sector of vehicle aerodynamics, for the investigation of side wind effects. At the present time, it is only possible to investigate vehicles for their side wind suitability by rotating the vehicle mounted on a rotatable platform with its longitudinal axis against the direction of flow. The aerodynamic data measured under these conditions, such as for example air-generated forces and air-generated moments of forces, are however applicable only to the case of steady flow, which in the practical operation of vehicles is substantially less important than the non-steady process which takes place when a vehicle enters a side wind gust. Attempts are made to record this effect by side wind installations past which vehicles travel at a specified speed. However, such investigations may be made, when developing a vehicle, only at stages of development which are already very far advanced, demand a high expenditure and are in addition still, as they must take place on a test track, highly dependent on the weather and feasible only under particular meteorological conditions. Moreover, when using a side wind test installation it is only possible to record effects which concern the guidance of the vehicle and not for example other influences which are essential for the vehicle development, such as for example the alteration of the flow noise upon a rapid alteration of the incident flow direction. Specifically in the case of luxury vehicles, which have only a low noise level in the interior, the alteration of the noise due to circumcirculation when the effective wind direction varies is very disturbing. These changes may not be recorded in conventional aeroacoustic wind tunnels for vehicle aerodynamics, in which wind tunnels the incident forced flow direction can be altered only by rotation of the vehicle mounted on a rotary platform. Thus, in order to solve this problem, it is necessary to have recourse to costly tests while the vehicle is being driven. However, these tests while the vehicle is being driven can take place only when a prototype is already available, i.e. substantial changes in development are scarcely possible any longer. Such a wind tunnel with adequate acoustic properties, i.e. a sufficiently low noise level, and at the same time an incident flow direction which can be altered in operation, can also be used in the quality control of high-quality cars. In fact, within the context of the final inspection, it is possible to check the interior noises with an appropriate wind speed and rotation of the nozzle, in order to detect causes of disturbing flow noises, such as for example incompletely sealed apertures, incorrectly adjusted doors, etc. In this way, it is possible to save considerable workshop service and warranty services.

Accordingly, the object is to provide a wind tunnel with which the effects of the variable oblique flow incidence can be simulated in a manner which is sufficiently true to reality.

Such a device is provided by the present invention of a wind tunnel having a free jet test section and having a wind tunnel nozzle which is rotatable when the wind tunnel is operating in order to generate a flow of variable direction. This nozzle comprises a nozzle front part which is rotatable about a vertical axis and which is separated from the upstream nozzle rear part in the region of the turning point of the nozzle contour between the—viewed from the nozzle center line—concave curvature of the nozzle rear part and the convex curvature of the nozzle front part and at this separation location is surrounded by an inlet rounding. This wind tunnel can additionally be equipped with acoustically effective devices which are integrated into the flow guidance system, in order to reduce the sound pressure level to such an extent that the perception and metrological recording of the flow noises which are dependent upon the incident flow direction is also possible.

DETAILED DESCRIPTION OF THE DRAWINGS

Figure 1:
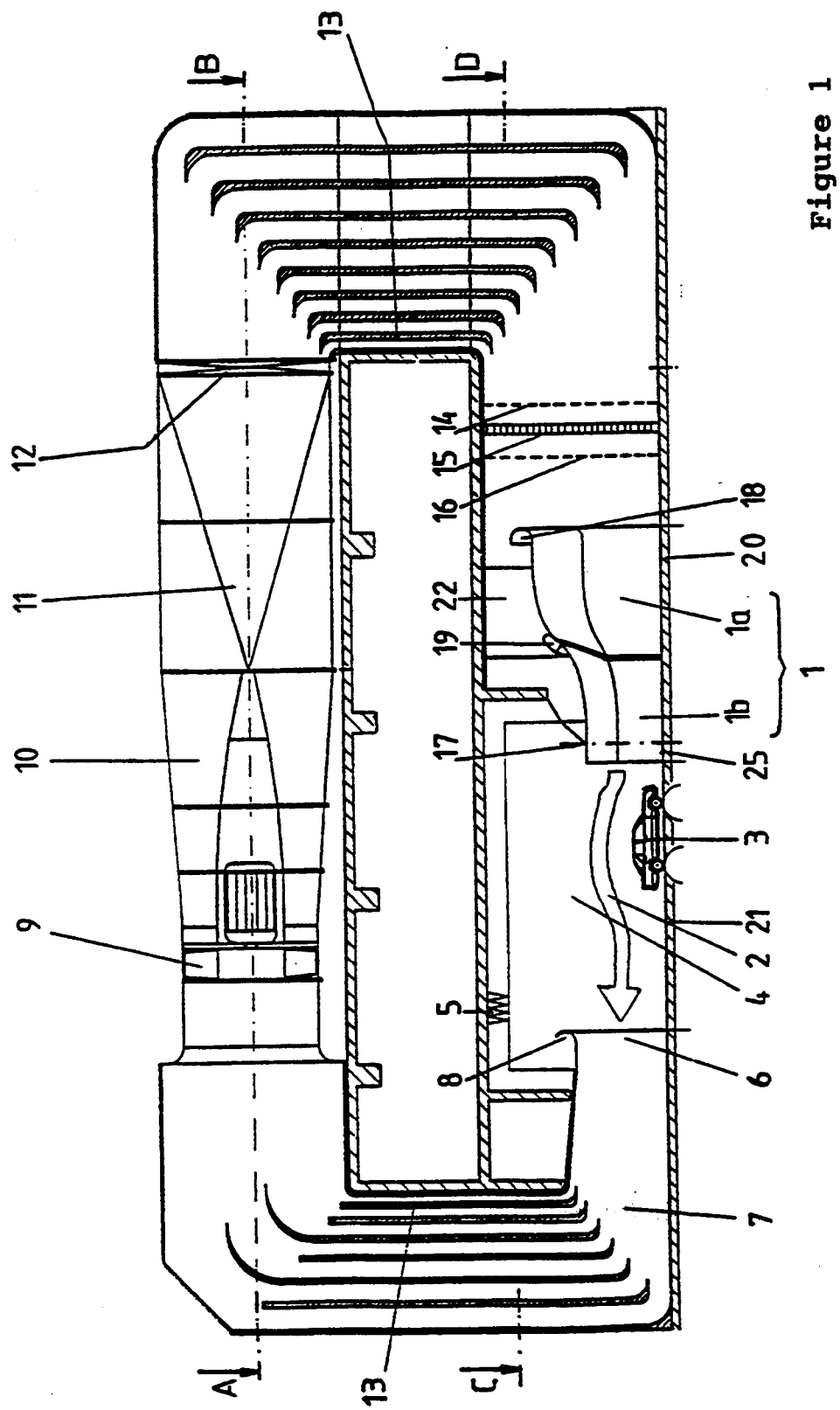
FIGS. 1 and 2 show differing elevations and cross-sections of the wind tunnel of the present invention.
Figure 2:
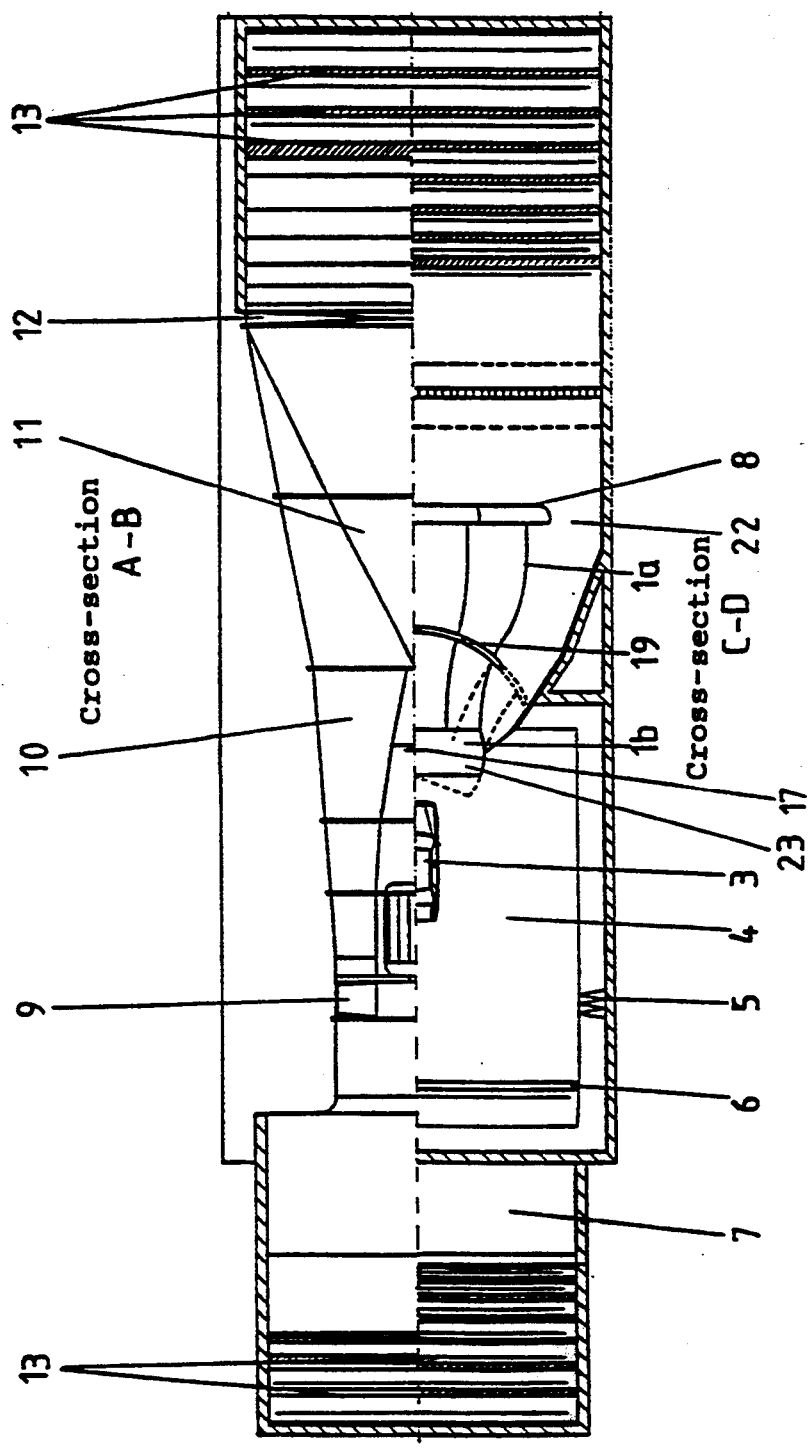

In the first instance, the structure of the wind tunnel is described with reference to FIGS. 1 and 2. The wind tunnel is designed as a so-called Göttinger wind tunnel with enclosed return flow. The wind tunnel jet, identified by the flow arrow (2), emerges from the nozzle (1) and circumcirculates the test object, in the case of FIGS. 1 and 2 a vehicle or a vehicle model (3). This vehicle stands on the rollers, only indicatively shown in FIG. 1, of a power test stand which can be integrated into the wind tunnel in order also to be able to carry out tests under driving conditions. The wind tunnel jet is surrounded by the test chamber (4). The internal wall of the test chamber can be given a conventional acoustic lining, e.g. in the form of acoustic wedges (5), in order to achieve the low reflection of soundwaves which is required for acoustic investigations. At that side of the test chamber (4) which is situated opposite the wind tunnel nozzle (1), the wind tunnel jet (2) enters the collector (6), which is followed by a diffuser (7). The collector (6) has a rounded or appropriately chamfered inlet rounding (8) and can be adjusted or displaced in a conventional manner in order to ensure that the static pressure in the wind tunnel jet (2) corresponds sufficiently precisely to the static pressure in the surroundings and in particular does not alter in an impermissible manner in the direction of flow.

Figure 4:
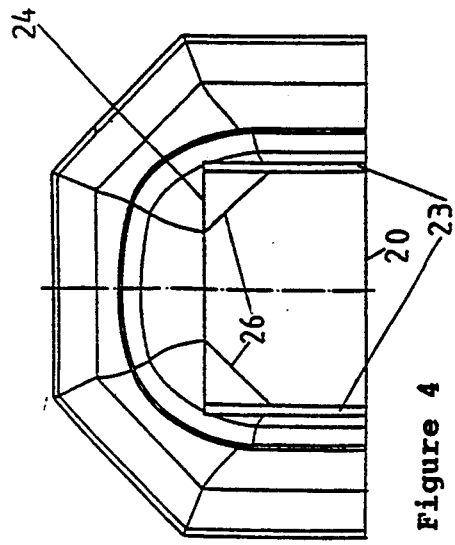
FIGS. 3–5 show a front elevation, side elevation and plan view
Figure 3:
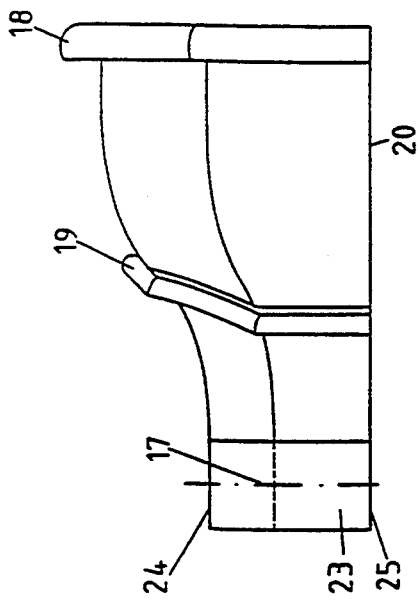
Figure 5:
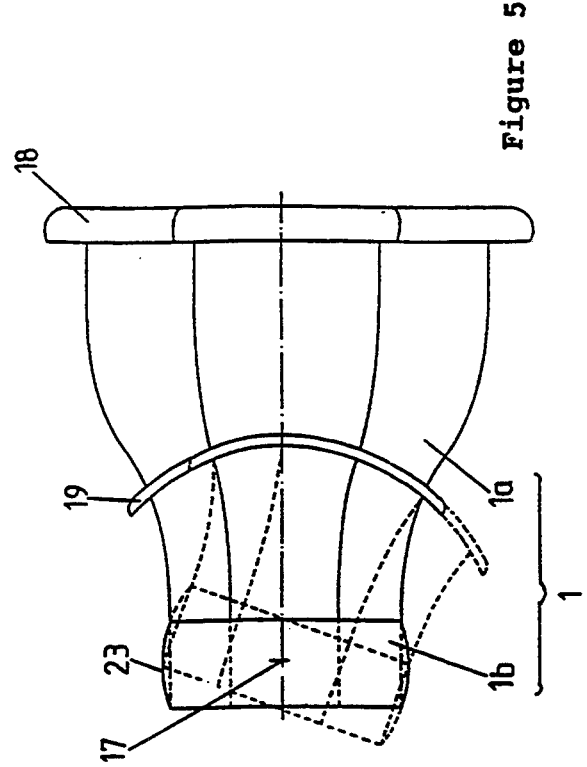

Downstream from the diffuser (7) in the connecting arm between the diffuser (7) and the fan (9), which in the present case is disposed above the test section (4), there is built in a deflection blade system which at the same time acts as an absorption and deflection acoustic attenuator. The fan (9) is an axial fan, the drive motor of which is accommodated in the fan hub. To this fan there is connected a conical diffuser (10). Behind this conical diffuser 10 there follows a cross-sectional shaping (11) from round to rectangular cross-section, which can at the same time also have diffuser properties, i.e. even further enlarges the flow cross-section in the direction of flow. A cooler (12) is incorporated at the end of this diffuser. This cooler (12) is required in order to conduct away again the energy which is introduced by the fan into the wind tunnel and which is converted into heat. This is important, since as a result of the acoustic equipment of the wind tunnel, which equipment has at the same time an insulating action, the removal of heat to the outside is made difficult to an even greater extent than in the case of conventional wind tunnels. In the cross-connection between the flow channel of the fan (9) and the flow channel with nozzle and test section, in a similar manner to what is applicable in the cross-arm of the flow guidance system between the collector (6) and the fan (9), flat-type acoustic attenuator elements (13) are incorporated, which elements serve at the same time for flow deflection and distribution. Downstream behind this device (13), which deflects the flow in total by 180°, there is situated a protective screen (14), followed by a straightener (15) and if required also one or more turbulence screens (16). The nozzle, identified as a whole by the reference symbol (1) and shown in more detail in FIGS. 3–5, comprises a stationary part (1a) and a part (1b) which is rotatable about the vertical axis (17). Both the stationary part (1a) and also the rotatable part (1b) are equipped with inlet roundings (18) and (19) respectively. In the present case, the nozzle (1) exhibits a flat horizontal floor (20), which lies in the same horizontal plane as the test chamber floor (21), on which the model (3) is positioned. The nozzle (1) itself is surrounded by a prechamber (22). If the rotatable nozzle front part (1b) is now rotated, within this nozzle prechamber (22) the stationary nozzle front part (1a) can be circumcirculated. Moreover, where the outflow cross-section from the stationary nozzle part (1a) is cleared by the rotation of the nozzle front part (1b), an outflow into this generously dimensioned nozzle prechamber (22) is possible. This has the effect of avoiding a backing up of the flow in the nozzle (1), and the velocity distribution at the exit of the rotatable nozzle (1b) in the test jet (2) is, if at all, only barely noticeably influenced by the rotation. If this nozzle prechamber (22) is given a sound-absorbing lining, it acts in conjunction with the advantageously likewise sound-absorbingly lined nozzle outer wall, in addition as a cheer acoustic attenuator. In order to achieve a sealing off of the nozzle prechamber (22) in relation to the test chamber, the outer wall of the rotatable nozzle front part (1b) is designed to be cylindrical with respect to the axis of rotation (17). The corresponding part of the outer wall is identified by the symbol (23). On this cylindrical outer wall (23) there may abut a sealing lip, which reliably seals the gap between the rotatable nozzle front part (1b) and the nozzle prechamber (22), even during operation with rotation. In a similar manner, a sealing is provided for the cylinder cross-sectional surface (24) at the top and, if required, also at the bottom at the nozzle front part (1b). If the floor (25) of the rotatable nozzle front part (1a) is in advantageous manner a circular section from the test chamber floor, then the sealing of the nozzle floor is applied for example as a lip sealing at the periphery of this circular section or beneath the same. The drive of the rotatable nozzle (1b), not shown in the figures, takes place via a hydraulic system or a sliding block drive and corresponds to the drive concepts which are conventional, according to the prior art, in mechanical engineering.

Figure 6:
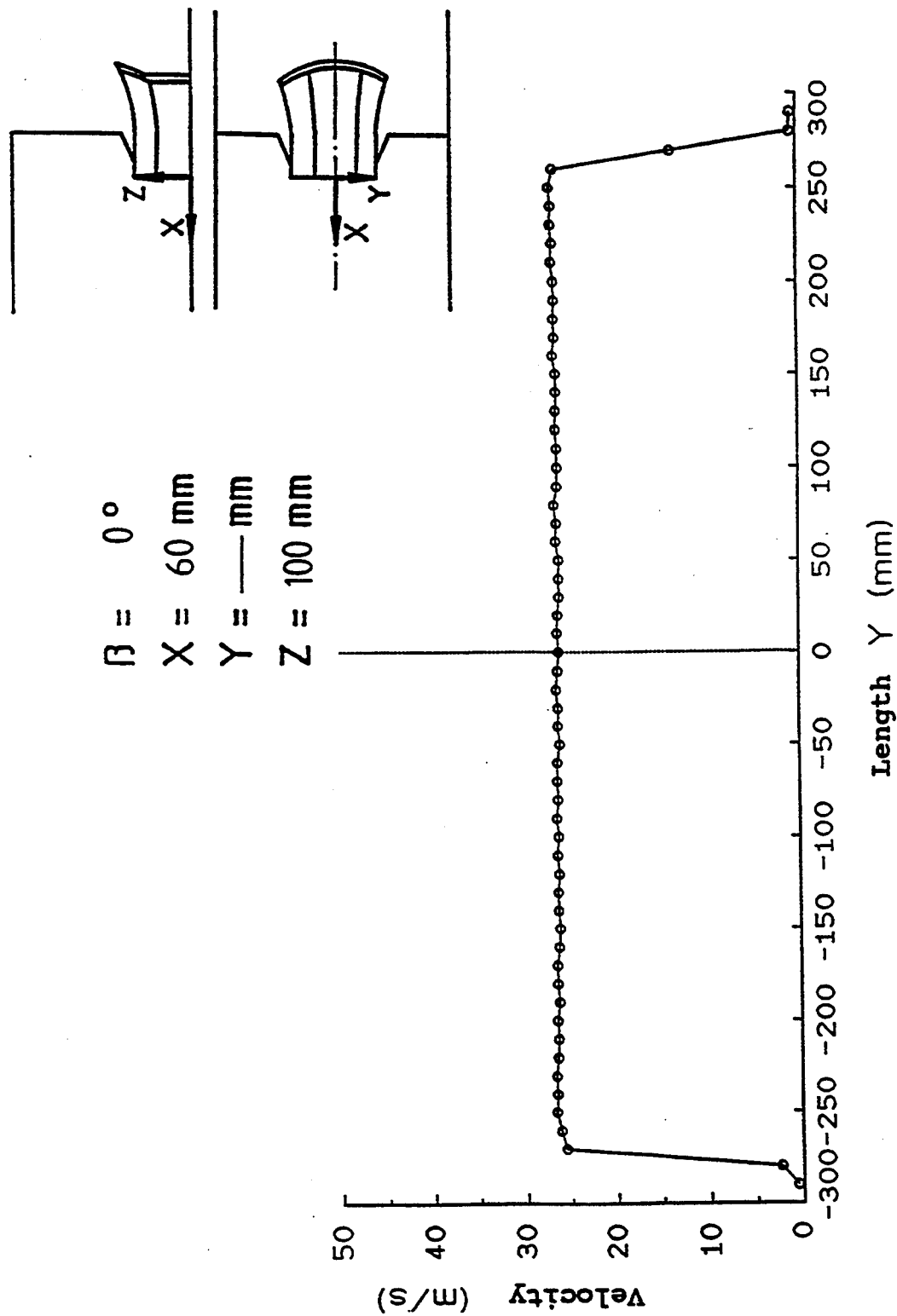
FIGS. 6 to 11 show velocity profiles, measured in the jet behind the nozzle exit cross-section, showing the uniformity and high quality of the jet flow when the nozzle is not rotated and when it is rotated.
Figure 7:
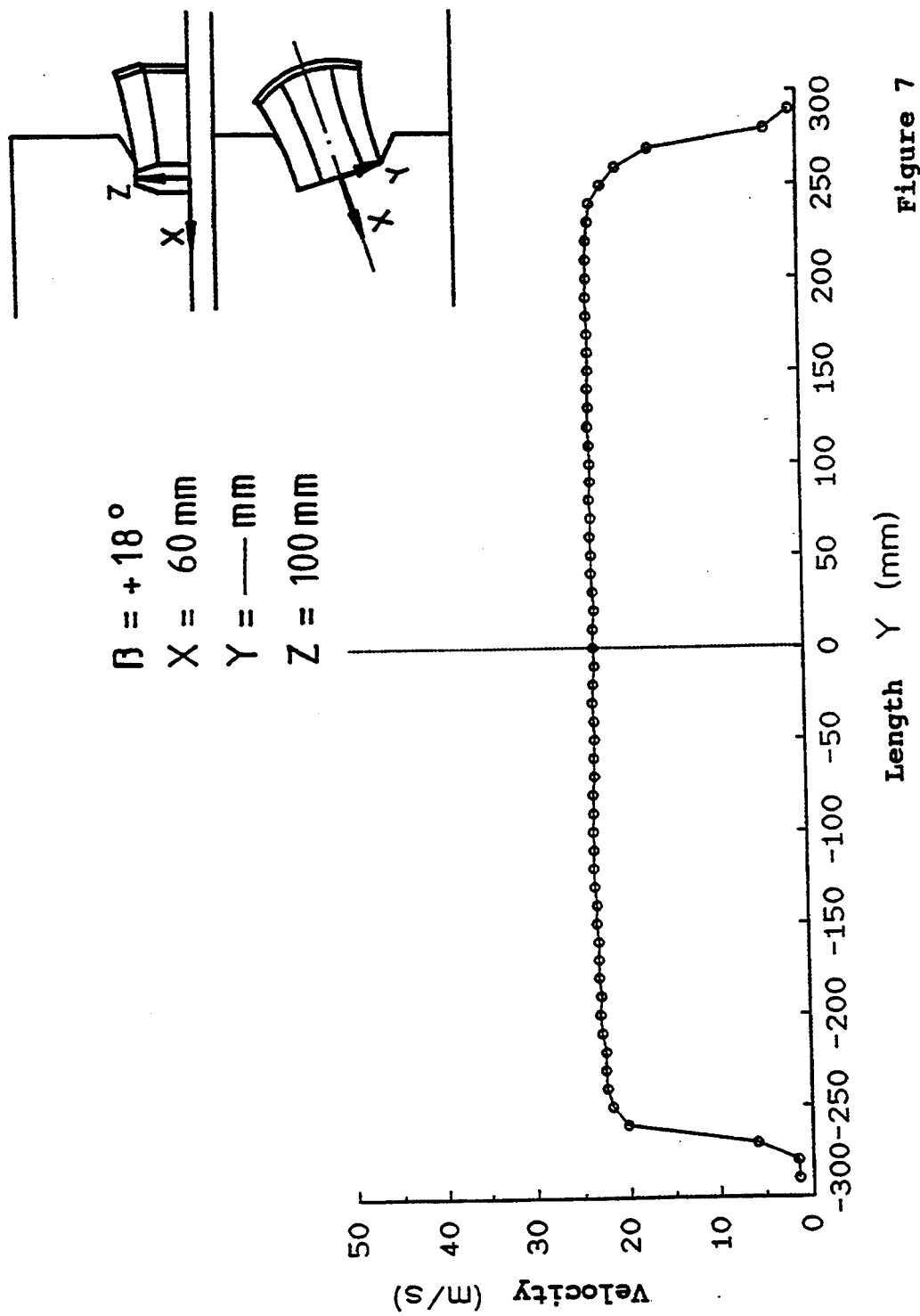
Figure 8:
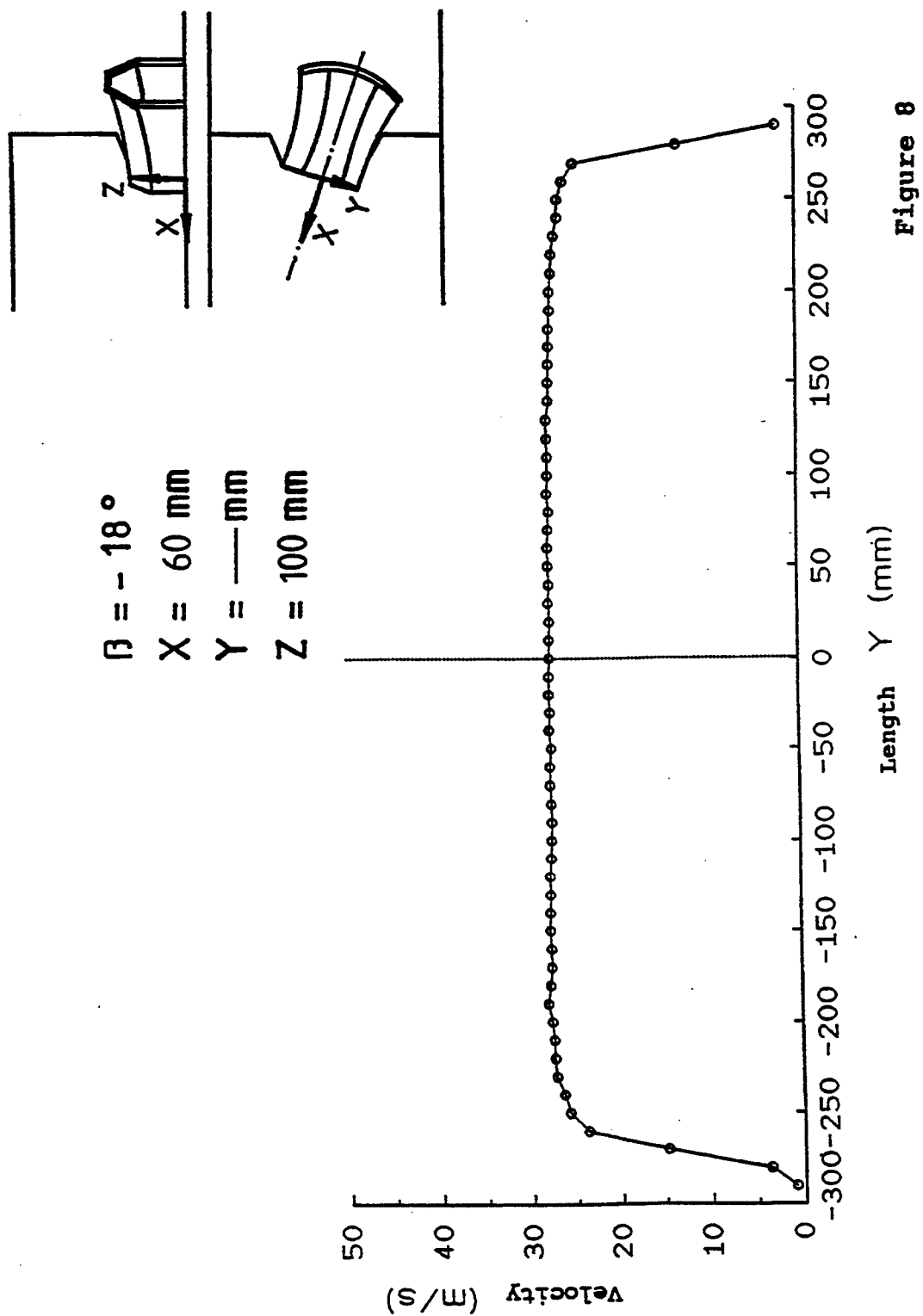
Figure 9:
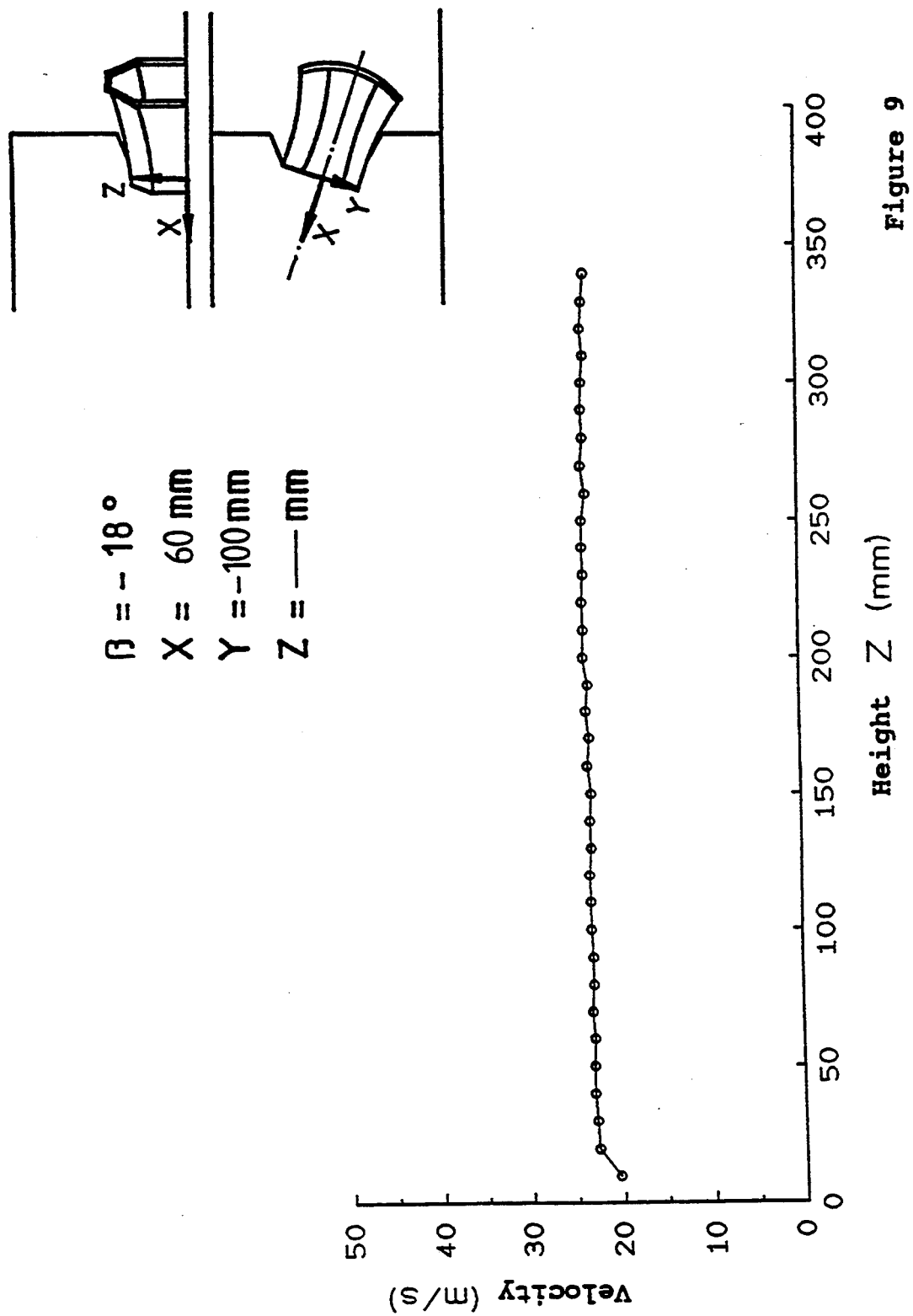
Figure 10:
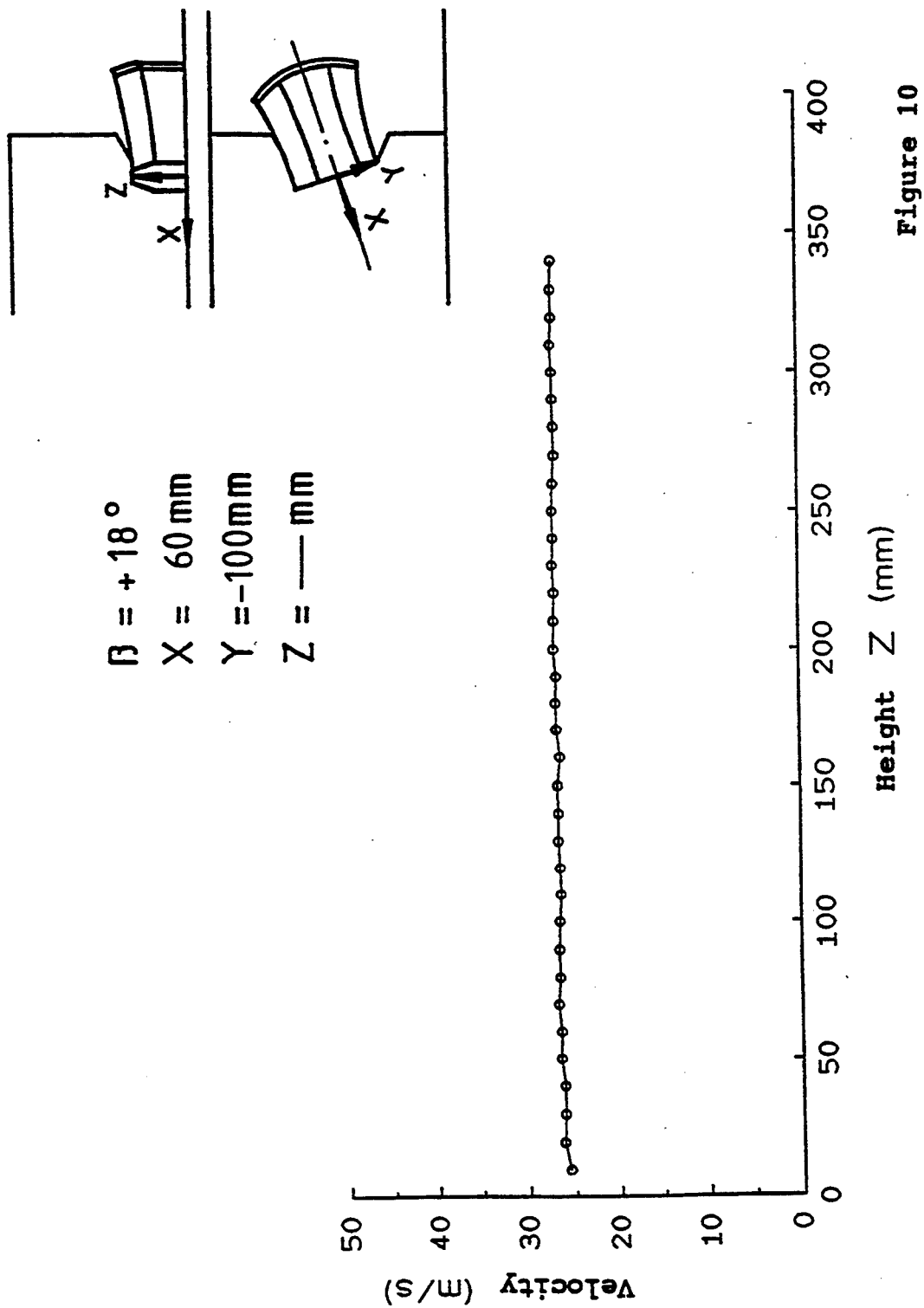
Figure 11:
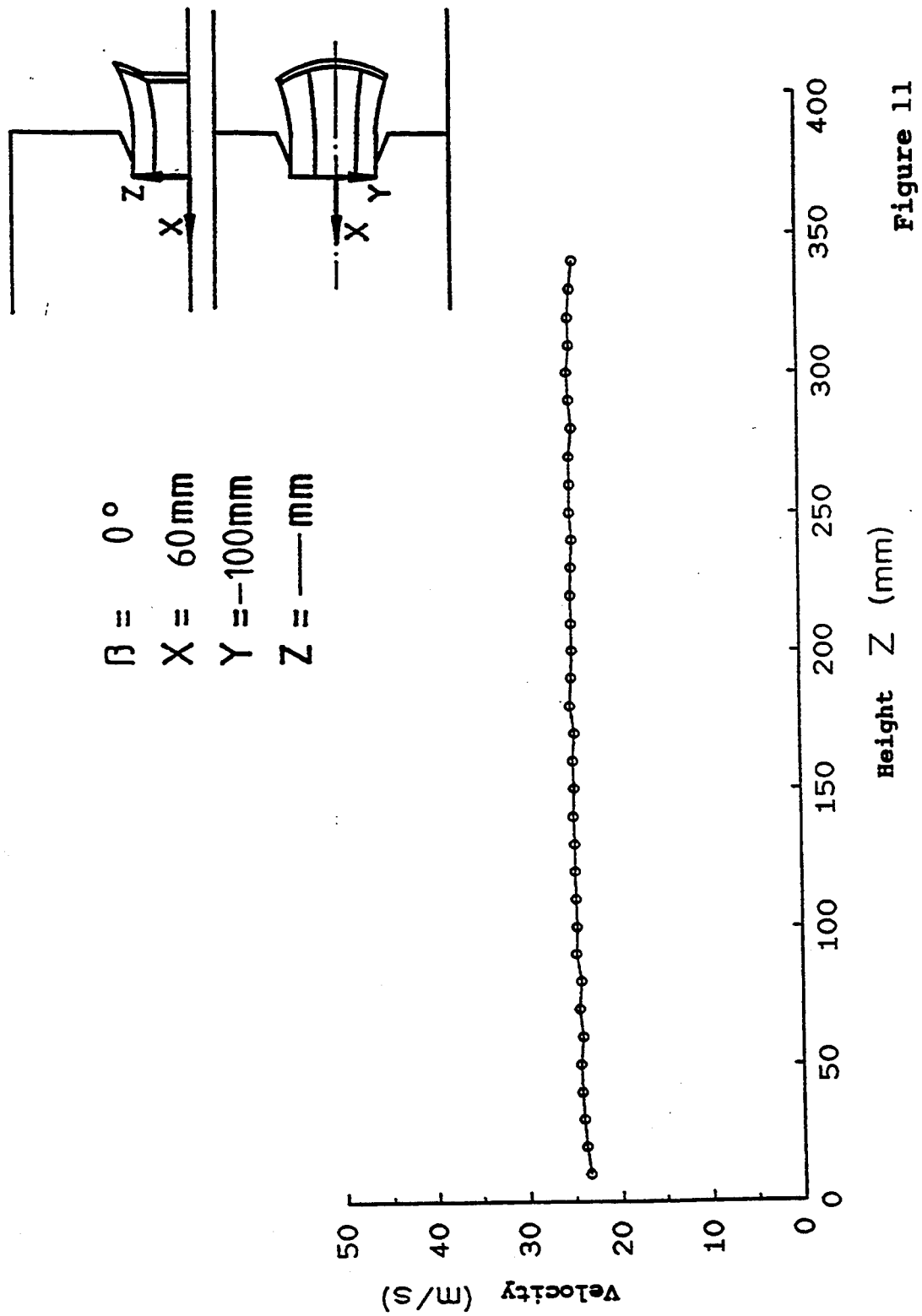

Results which were measured on a model wind tunnel with such a rotatable nozzle are shown in FIGS. 6 to 10, in the form of velocity distributions. FIG. 6 shows a velocity profile, 60 mm downstream from the wind tunnel nozzle at a height of 100 mm above the test section floor. These dimensions are to be considered as an example for a model approximately to the scale 1:5 to 1:8, related to the wind tunnel in its full-scale construction, which permits the investigation of a full-size passenger car. It is seen that the velocity distribution is very uniform. FIG. 7 shows for angle of rotation $\beta = +18°$ and FIG. 8 for angle of rotation $\beta = -18°$, likewise, almost just as uniform velocity distributions as for $\beta = 0°$. In FIG. 9, the vertical velocity profile along the height coordinate Z is plotted, and specifically again for angle of rotation 0°. FIGS. 10 and 11 show the corresponding velocity profiles for the nozzle rotated through $+18°$ and $-18°$ respectively. In these cases also, the velocity distributions are again very uniform and are not significantly different from the velocity distribution of the nozzle without rotation. Thus, the invention achieves the set object of providing a wind tunnel with good flow quality and with which an alteration of the direction of flow is possible during wind tunnel operation, i.e. when the wind tunnel jet is directed at the object situated in the wind tunnel.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Wind tunnel having a free jet test section, comprising:
a nozzle which is rotatable about a vertical axis for altering the direction of flow, said nozzle having a rotatable nozzle front part that changes the direction of flow upon rotation of the nozzle front part, the nozzle front part having an exit cross-section which is entirely free of flow-disturbing components, and an upstream nozzle rear part, wherein the nozzle front part is separated from the upstream nozzle rear part in a turning point region of a nozzle contour at a transition from a convex curvature of the nozzle wall to a concave curvature in the front region of the nozzle, and the nozzle front part is surrounded at this separation location by an inlet rounding.

2. Wind tunnel having a free jet test section according to claim 1, wherein the wind tunnel includes a floor plate that has a circular section, and the nozzle front part is mounted on said circular section, a center of said circular which section lies on a vertically extending axis of rotation of the nozzle front part.

3. Wind tunnel having a free jet test section according to claim 2, further comprising a chamber that surrounds the nozzle and a cylinder that surrounds the nozzle front part concentrically with the axis of rotation, the cylinder having an envelope surface which seals off the nozzle front part in a plug manner, during rotation of the nozzle front part, in relation to said chamber.

4. Wind tunnel having a free jet test section according to claim 3, wherein the chamber establishes a compensating flow upon rotation of the nozzle front part.

5. Wind tunnel having a free jet test section according to claim 4, wherein the chamber which surrounds the nozzle has a rectangular cross-section in the region of the entry into the nozzle rear part, and has a lateral indentation that adapts in the region of the nozzle front part to the nozzle contour.

6. Wind tunnel having a free jet test section according to claim 1, wherein the angular velocity of the rotation is within a range between 30 degrees of angle per second and 120 degrees of angle per second and the rotational angle range comprises ±30°, preferably approximately ±20°.

7. Wind tunnel having a free jet test section according to claim 2, wherein the cross-section of the nozzle has a top with chamfered corners and corresponds to the upper half of an octagonal cross-section that has a horizontal axis which falls within the floor plate.

8. Wind tunnel having a free jet test section according to claim 3, wherein the height of the cylinder is equal to or greater than the height of the nozzle and the cylinder terminates at its top in a horizontal sealing surface.

9. Wind tunnel having a free jet test section according to claim 3, wherein the cross-section of the chamber is in a ratio of 12 to 5 to a nozzle entry cross-section and wherein the nozzle has a ratio of entry cross-section to exit cross-section in the ratio 2 to 6.

10. Wind tunnel having a free jet test section according to claim 1, wherein the rotatable nozzle front part has a ratio of entry cross-section to exit cross-section in the ratio 1.5 to 3.

* * * * *